US011936107B2

(12) United States Patent
Sheng et al.

(10) Patent No.: US 11,936,107 B2
(45) Date of Patent: Mar. 19, 2024

(54) DIPOLE-RESONATOR RESISTIVE ABSORBER

(71) Applicant: The Hong Kong University of Science and Technology, Hong Kong (CN)

(72) Inventors: Ping Sheng, Hong Kong (CN); Sichao Qu, Hong Kong (CN); Yuxiao Hou, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 366 days.

(21) Appl. No.: 17/391,247

(22) Filed: Aug. 2, 2021

(65) Prior Publication Data

US 2022/0045435 A1 Feb. 10, 2022

Related U.S. Application Data

(60) Provisional application No. 63/147,763, filed on Feb. 10, 2021, provisional application No. 63/103,470, filed on Aug. 7, 2020.

(51) Int. Cl.
*H01Q 17/00* (2006.01)
*H01Q 9/16* (2006.01)

(52) U.S. Cl.
CPC ............... *H01Q 17/00* (2013.01); *H01Q 9/16* (2013.01)

(58) Field of Classification Search
CPC ............ G01R 19/0084; G01R 19/0092; G01R 19/16566; G01R 19/175; G01R 31/3278;
(Continued)

(56) References Cited

U.S. PATENT DOCUMENTS 4,913,792 A * 4/1990 Nagata ............... G01N 27/4141 204/426
5,325,094 A * 6/1994 Broderick .......... H01Q 15/0026 342/1
5,576,710 A * 11/1996 Broderick ............. H01Q 17/00 342/1

FOREIGN PATENT DOCUMENTS

CN 209418771 U 9/2019
CN 111064009 A 4/2020
WO WO-2007080368 A1 * 7/2007 ......... H01Q 15/0013

OTHER PUBLICATIONS

Ding, Fei et al. "Ultra-broadband microwave metamaterial absorber." Applied physics letters 100.10 (2012): 103506.
(Continued)

*Primary Examiner* — Timothy A Brainard
(74) *Attorney, Agent, or Firm* — Nath, Goldberg & Meyer; Jerald L. Meyer

(57) ABSTRACT

The dipole-resonator resistive absorber is a metamaterial absorber operating in the microwave regime. A single unit of the dipole-resonator resistive absorber includes a first rectangular conductive ring having a pair of first resistors mounted thereon and in electrical communication therewith, and a plurality of parallel linear arrays of second rectangular conductive rings, where each of the second rectangular conductive rings has a pair of second resistors mounted thereon and in electrical communication therewith. The first rectangular conductive ring is mounted above the plurality of parallel linear arrays of the second rectangular conductive rings, and this structure is backed by an electrically conductive layer. The single unit dipole-resonator resistive absorber may be expanded into an arrayed structure, forming a polarization-independent dipole-resonator resistive absorber.

11 Claims, 12 Drawing Sheets

(58) Field of Classification Search
CPC .... G01R 31/382; G01R 31/396; H01Q 17/00; H01Q 9/16; H01Q 17/002
See application file for complete search history.

(56) References Cited

OTHER PUBLICATIONS

Xiong, Han et al. "An ultrathin and broadband metamaterial absorber using multi-layer structures." Journal of Applied Physics 114.6 (2013): 064109.

* cited by examiner

DIPOLE-RESONATOR RESISTIVE ABSORBER

CROSS-REFERENCE TO RELATED APPLICATION

This application claims the benefit of U.S. Provisional Patent Application No. 63/147,763, filed on Feb. 10, 2021, and U.S. Provisional Patent Application No. 63/103,470, filed on Aug. 7, 2020, each of which is hereby incorporated by reference in its entirety.

BACKGROUND

1. Field

The disclosure of the present patent application relates to microwave absorbers, and particularly to a microwave absorber formed as a multi-layer, hierarchical structure of arrayed rectangular rings each loaded with resistance.

2. Description of the Related Art

Electromagnetic wave absorption has been an enduring topic of study for many decades. The recent development of metamaterial absorbers (MMAs), based on designed structures with subwavelength thickness, has injected new momentum on this subject, with potential applications to a broad range of wave frequencies, ranging from microwave to terahertz, near-infrared and visible light. Due to its long wavelength and high penetrability through solid walls, microwave absorption has always been the most difficult to achieve. With the upcoming 5G technology and its high frequency microwave bands, the microwave power (which increases as the quadratic function of the frequency) permeating the air is foreseen to be significantly increased, since the high frequency waves not only carry more information, but also much more power. Thus, microwave absorbers covering the 5G high-frequency band (around 3 GHz to ~40 GHz) are of great interest, since they not only can provide the balance between necessary monitoring activity and privacy, but also a means to remediate the potential health concerns that arise from the inevitable long-term exposure to significantly higher microwave power.

An ideal microwave absorber should absorb over a wide frequency bandwidth, as well as being thin and compact for ease of use. Present metamaterial-based absorbers can only exhibit near-perfect absorption at one frequency or at several discretized frequencies, due to the inherent resonance-based mechanism of metamaterials and their attendant dispersive characteristics. In order to extend the absorption frequency band of MMAs, great effort has been put into either increasing the dissipation (i.e., using resistive sheets or loading with lumped elements) or superposing/integrating resonant units (i.e., constructing multilayer patch absorbers with different sizes), but the wideband performance of such efforts has still been limited. Additionally, the geometries of such structures are fairly complex, making their mass production unrealistic.

Given the limitations of present MMAs, it would be desirable to be able to develop a microwave absorber for 5G use, which has a broadband absorption spectrum covering the target frequency range, and also has near-perfect absorption over the entire spectrum. It would be further desirable to develop a microwave absorber which is close to the minimum sample thickness (as dictated by the causality constraint), which has minimal angle dependence of the incident wave, with no polarization dependence, and which is easy and cheap to be mass-produced for various potential applications. Thus, a dipole-resonator resistive absorber solving the aforementioned problems is desired.

SUMMARY

A unit cell of a dipole-resonator resistive absorber (DRRA), which is functional for a single polarization of the incident wave, includes a single first rectangular conductive ring, which has a pair of first resistors mounted thereon and in electrical communication therewith, and a plurality of parallel linear arrays of second rectangular conductive rings. Each of the second rectangular conductive rings has a pair of second resistors mounted thereon and in electrical communication therewith. The first rectangular conductive ring is mounted above the plurality of parallel linear arrays of the second rectangular conductive rings. An electrically conductive layer (i.e., the PEC layer) is further provided, such that the plurality of parallel linear arrays of the second rectangular conductive rings is sandwiched between the first rectangular conductive ring and the PEC layer. The dimensions of the first rectangular conductive ring are larger than dimensions of each of the second rectangular conductive rings. Additionally, a first plane defined by the first rectangular conductive ring may be parallel to planes defined by the plurality of parallel linear arrays of the second rectangular conductive rings.

The above unit cell DRRA can be expanded to a polarization-independent DRRA by forming a two-dimensional array of multiple ones of the unit cell DRRA. The polarization-independent dipole-resonator resistive absorber (DRRA) is a broadband microwave absorber which exhibits near-perfect (i.e., 20 dB on average) absorption from 3 GHz to 40 GHz, with almost no measured incident angle dependence up to 45°. The dipole-resonator resistive absorber is formed from a plurality of parallel, longitudinally-extending, linear arrays of first rectangular conductive rings and a plurality of parallel, laterally-extending, linear arrays of second rectangular conductive rings, where the longitudinal and lateral directions are orthogonal to one another. Each of the first rectangular conductive rings has a pair of first resistors mounted thereon and in electrical communication therewith and, similarly, each of the second rectangular conductive rings has a pair of second resistors mounted thereon and in electrical communication therewith.

The plurality of parallel, longitudinally-extending, linear arrays of the first rectangular conductive rings intersect the plurality of parallel, longitudinally-extending, linear arrays of the second rectangular conductive rings to form an upper rectangular grid layer. Adjacent ones of the first rectangular conductive rings are separated by corresponding ones of the laterally-extending, linear arrays of the second rectangular conductive rings, and adjacent ones of the second rectangular conductive rings are separated by corresponding ones of the longitudinally-extending, linear arrays of the first rectangular conductive rings, such that the plurality of parallel, longitudinally-extending, linear arrays of the first rectangular conductive rings and the plurality of parallel, laterally-extending, linear arrays of the second rectangular conductive rings define a rectangular array of interstitial chambers, which may be filled with microwave-absorbing foam. The dimensions of each of the first rectangular conductive rings may be equal to the dimensions of each of the second rectangular conductive rings, and the resistances of each of the pairs of first resistors may be equal to resistances of each of the pairs of second resistors, thus making the first and second rectangular conductive rings substantially identical in construction.

Additionally, a plurality of parallel, longitudinally-extending, linear arrays of third rectangular conductive rings and a plurality of parallel, laterally-extending, linear arrays of fourth rectangular conductive rings are provided. The plurality of parallel, longitudinally-extending, linear arrays of the third rectangular conductive rings intersect the plurality of parallel, longitudinally-extending, linear arrays of the fourth rectangular conductive rings to form a lower rectangular grid layer. Adjacent ones of the third rectangular conductive rings are separated by corresponding ones of the laterally-extending, linear arrays of the fourth rectangular conductive rings, and adjacent ones of the fourth rectangular conductive rings are separated by corresponding ones of the longitudinally-extending, linear arrays of the third rectangular conductive rings.

The dimensions of each of the third rectangular conductive rings may be equal to the dimensions of each of the fourth rectangular conductive rings, and the resistances of each of the pairs of third resistors may be equal to resistances of each of the pairs of fourth resistors, thus making the third and fourth rectangular conductive rings substantially identical in construction. The third rectangular conductive rings and the fourth rectangular conductive rings are similar in construction to the first and second rectangular conductive rings, including having third and fourth pairs of resistors respectively mounted thereon and in electrical communication therewith, but the third and fourth rectangular conductive rings have smaller dimensions compared to the first and second rectangular conductive rings.

The upper rectangular grid layer is mounted on the lower rectangular grid layer. An electrically conductive layer, referred to as a "perfect electrical conductor" (PEC) layer, is further provided. The lower rectangular grid layer is sandwiched between the upper rectangular grid layer and the PEC layer. The PEC layer may be formed from a thin metal plate or the like.

The DRRA uses magnetically excited (electrical) dipole resonances that not only ensure an appreciable magnetic permeability for impedance matching to vacuum, but also leads to a large resonance linewidth due to radiation loss. The design of the DRRA also makes use of "dispersion engineering" via tuning of the dissipative resistance, thus achieving the broadband absorption condition. Further, the self-similar hierarchical structure of the DRRA extends the absorption spectrum to the ultra-broadband regime. Additionally, the usage of the microwave-absorbing foam allows for the absorption of the diffraction orders in the higher frequency regime.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The dipole-resonator resistive absorber (DRRA) uses magnetically excited (electrical) dipole resonances that not only ensure an appreciable magnetic permeability for impedance matching to vacuum, but also leads to a large resonance linewidth due to radiation loss. The design of the DRRA also makes use of "dispersion engineering" via tuning of the dissipative resistance, thus achieving the broadband absorption condition. Further, the self-similar hierarchical structure of the DRRA extends the absorption spectrum to the ultra-broadband regime. Additionally, the usage of the microwave-absorbing foam allows for the absorption of the diffraction orders in the higher frequency regime.

The effective sample parameters $\varepsilon_{eff}$ and $\mu_{eff}$ (the effective permittivity and permeability, respectively) are important for characterizing the functionality of the dipole-resonator resistive absorber (DRRA), as well as understanding its underlying mechanism. The following illustrates how these two consecutive parameters are extracted from the S-parameters, followed by a derivation of their theoretical requirements for high absorption at a single frequency. This is necessary since, from the perspective of physical understanding, an important requirement for high absorption is impedance-matching with air to minimize the reflection, along with the dissipation of the incident energy. Here, the electromagnetic impedance $Z_{eff}$ is defined as $$Z_{eff}=\sqrt{\frac{\mu_{eff}}{\varepsilon_{eff}}}.$$

Figure 1:
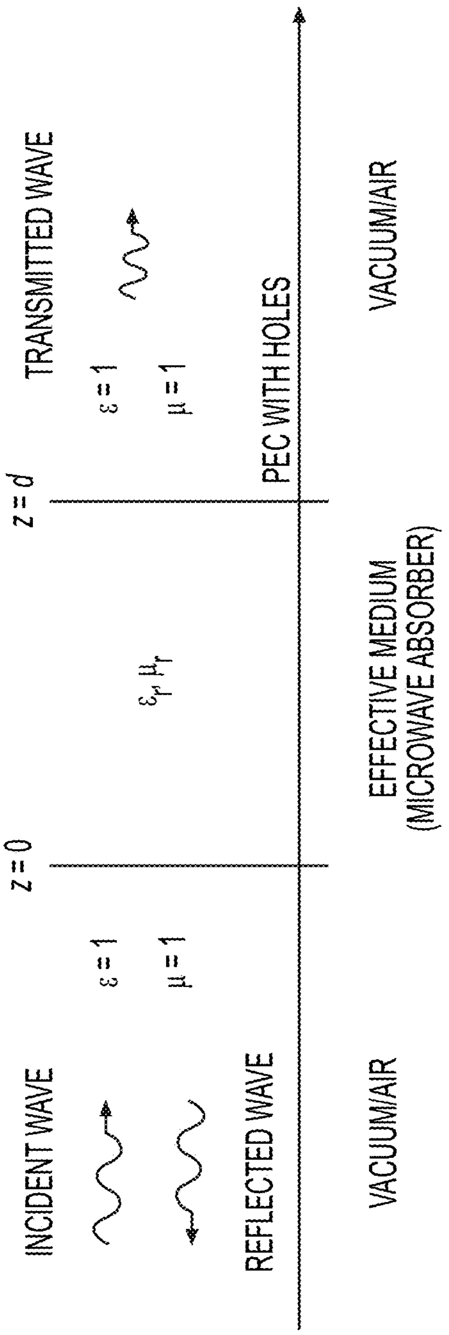
FIG. 1 (PRIOR ART)
FIG. 1 diagrammatically illustrates a normally incident plane wave on a layer of a conventional metamaterial absorber in free space.

Metamaterial absorbers are usually composed of periodic units. The dimensions of one unit should ideally be sub-wavelength (i.e., the lateral periodicity is smaller than the incident wavelength). This condition is the basis for treating a metamaterial absorber as a homogeneous layer, with effective materials properties. For simplicity, the relative effective permittivity $$\varepsilon_r=\frac{\varepsilon_{eff}}{\varepsilon_0}$$

and permeability $$\mu_r=\frac{\mu_{eff}}{\mu_0}$$

and the vacuum relative permittivity ε and permeability μ are adopted as 1. It should be noted that most metamaterial microwave absorbers are backed by a thin metal plate, serving as the perfect electric conductor (PEC) boundary at z=d, as shown in FIG. 1.

In order to extract $\varepsilon_r$ and $\mu_r$ from the S-parameters in simulations, both the reflection $S_{11}$ and transmission $S_{21}$ information are necessary. Since the PEC eliminates transmission, in numerical simulations, small holes are opened at four corners (in one unit) on the metal plate, thus allowing small transmission as perturbation (as shown in FIG. 6A). Because the size of the holes is small (as a perturbation), the metallic plate can still be treated as a PEC backing. In fact, the PEC backing plays an important role in impedance matching conditions for the microwave-absorbing effect by supporting the anti-parallel magnetic currents. The relationship between the S-parameters ($S_{11}$ and $S_{21}$) and the effective $\varepsilon_r$ and $\mu_r$ are discussed below.

The relative refractive index n and relative impedance Z are be given by:

$$Z=\pm\sqrt{\frac{(1+S_{11})^2-S_{21}^2}{(1-S_{11})^2-S_{21}^2}},\text{ and} \tag{1}$$

$$e^{ink_0d}=X\pm i\sqrt{1-X^2}, \tag{2}$$

$$\text{where } X=\frac{1}{2S_{21}(1-S_{11}^2+S_{21}^2)}.$$

From the definitions $$n=\sqrt{\varepsilon_r\mu_r}\text{ and }Z=\sqrt{\frac{\mu_r}{\varepsilon_r}},$$

the effective $$\varepsilon_r=\frac{n}{Z}$$

and $\mu_r$=nZ. The signs in equations 1 and 2 are determined by the requirements Re[Z]>0 and Im[n]>0, since the metamaterial under consideration is a passive medium.

Equations (1) and (2) not only provide a way to extract effective parameters of a metamaterial absorber, but also reveal the theoretical requirement of $\varepsilon_r$ and $\mu_r$. This can be seen as follows: since the absorption coefficient is given by $A=1-|S_{11}|^2-|S_{21}|^2$, high absorption can be achieved if $S_{11}$ and $S_{21}$ are minimized. With the requirements that $S_{11}\rightarrow 0$ and $S_{21}\rightarrow 0$, relative impedance Z should be close to 1; i.e., impedance matching in accordance to equation (1) (i.e., $\varepsilon_r=\mu_r$). Meanwhile, the quantity $X\rightarrow\infty$ if $S_{11}\rightarrow 0$ and $S_{21}\rightarrow 0$. Thus, according to equation (2), $e^{ink_0d}=X\pm i\sqrt{1-X^2}\cong X-|X|\rightarrow 0$, with the proper choice of the sign. Thus, under the impedance-matching condition $\varepsilon_r=\mu_r$, the only way to meet the requirement $e^{ink_0d}=e^{iRe[\varepsilon_r]k_0d}e^{-Im[\varepsilon_r]k_0d}\rightarrow 0$ is to set the imaginary parts of $\varepsilon_r$ and $\mu_r$ to be relatively large.

Figure 2:
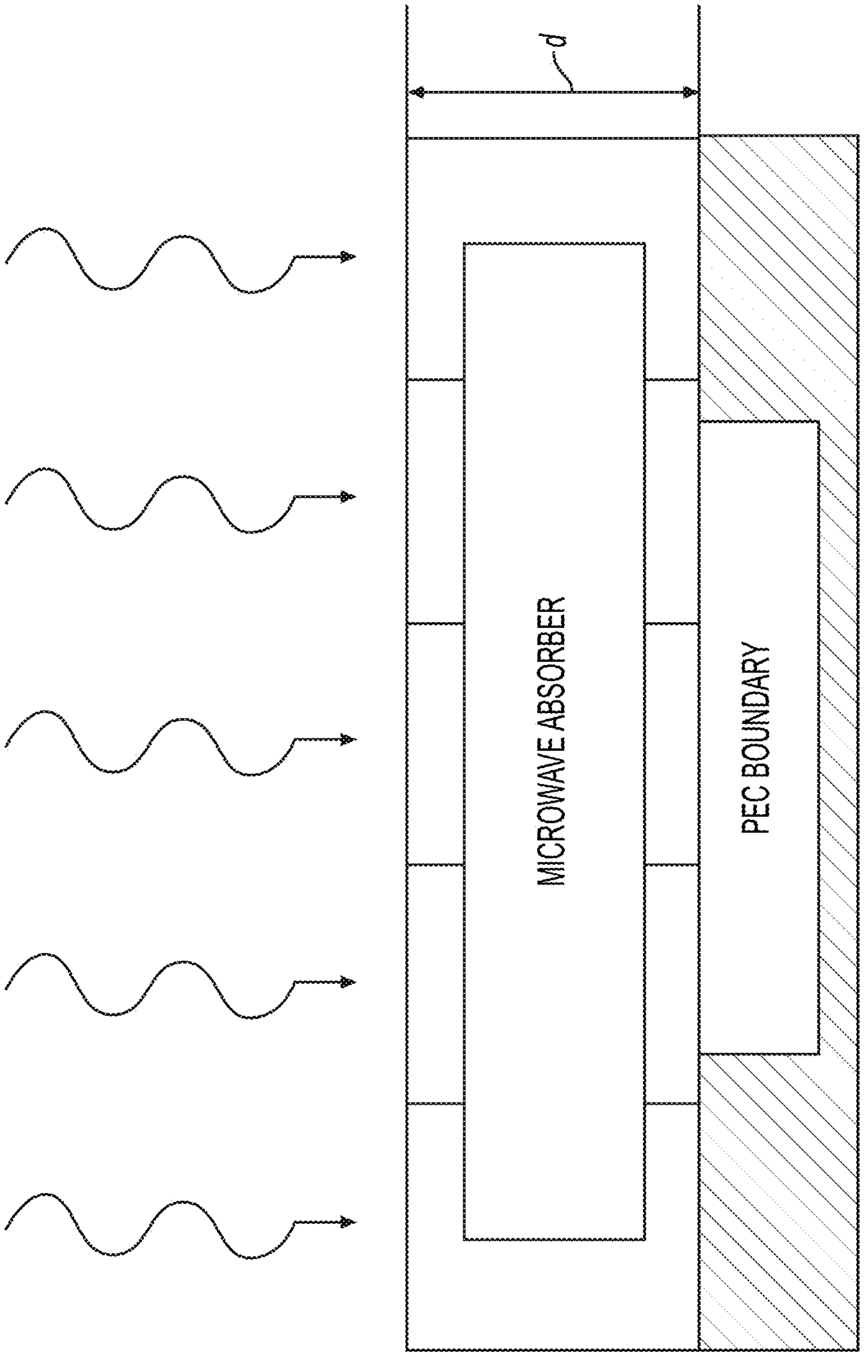
FIG. 2 (PRIOR ART)
FIG. 2 diagrammatically illustrates a normally incident plane wave on a layer of a conventional microwave absorber backed by a perfect electrical conductor (PEC) boundary layer.

For passive absorbers, such as the present dipole-resonator resistive absorber (DRRA), the theoretical requirements discussed above cannot be satisfied for all frequencies for a finite-thickness absorber, due to the "causality law". The causal nature of material response cannot only mathematically lead to the well-known Kramers-Kronig relation that relates the real and imaginary parts of the response function of materials (e.g., electric and magnetic susceptibility), but also the inequality relating the sample thickness d to the reflection coefficient R(λ):

$$d\geq d_{min}=\frac{1}{4\pi^2}\frac{\mu_0}{\mu_{eff}}\left|\int_0^\infty \ln|R(\lambda)|d\lambda\right|, \tag{3}$$

where λ is the wavelength and $\mu_0$ and $\mu_{eff}$ are the permeability of vacuum and the effective permeability of the microwave absorber in the static limit, respectively. $d_{min}$ is defined as the causality-constrained minimum sample thickness. For non-magnetic microwave absorbers, $\mu_{eff}$ takes the value identical to the vacuum permeability $\mu_0$. It should be noted that in equation (3), the absorber is assumed to be backed by a PEC so that there is no transmitted wave (as illustrated in FIG. 2). Equation (3) indicates that the main contribution to the integral is from the long wavelength component of the absorption spectrum (i.e., the low frequency part). This indicates that high absorption in the low frequency regime, over a finite frequency range, can require a large sample thickness.

In addition to the causality-constrained minimum sample thickness, there are other factors which may be considered as quantitative tools for estimating the performance of an absorber, such as its thickness ratio, $R_c$, which is given by $$R_c = \frac{d}{d_{min}}.$$

In the present case, the causality-dictated minimal thickness $d_{min}$=13.5 mm so that $R_c$=1.05, which means that the present absorber thickness is very close to the causality limit. Another widely used indicator is the relative bandwidth, which is defined as $$B_w = \frac{2(f_2 - f_1)}{(f_2 + f_1)},$$

where $f_1$ and $f_2$ denote the minimum and maximum frequencies, respectively, corresponding to the operating band for at least 90% reflection loss. Table 1 below compares the parameters of the DRRA, including the microwave-absorbing foam, with just the foam itself:

TABLE 1

Comparison of DRRA with Foam

| Sample | Thickness | Operating band | $B_w$ | Averaged reflection loss (dB) | $R_c$ |
|---|---|---|---|---|---|
| Our work | 14.2 mm | 3-40 GHz | 1.72 | −19.4 dB | 1.05 |
| Foam | 14.2 mm | 3-40 GHz | 1.72 | −15.4 dB | 1.40 |

In the absence of transmission, the energy of the incident wave is converted into to three parts above as R+D+A=1, where D is the diffraction, given by $D=\Sigma_{i>1}|S_{i1}|^2$, where the summation over i indicates the total diffracted energy of different diffraction orders, R is the reflection, given as $R=|S_{11}|^2$, and A is the absorption. The reflection loss is given by 1−R, which is the summation of the absorption and diffraction. In the dB scale, reflection loss is defined by the value of $10 \log_{10}(R)$.

Figure 3A:
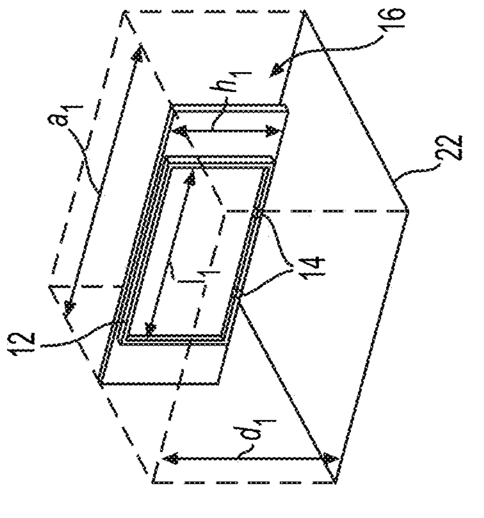
FIG. 3A is a perspective view of an upper layer of a single cell of a dipole-resonator resistive absorber (DRRA).
Figure 3B:
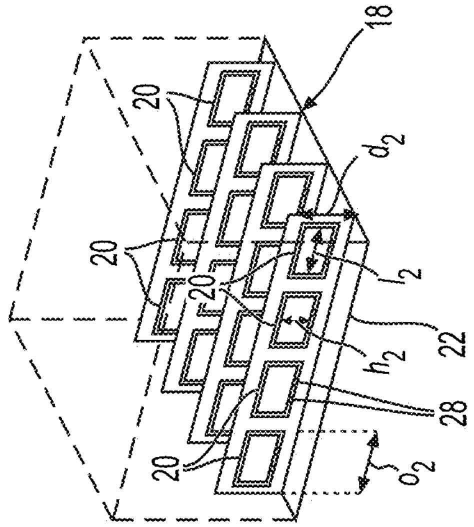
FIG. 3B is a perspective view of a lower layer of the single cell of the DRRA.
Figure 3C:
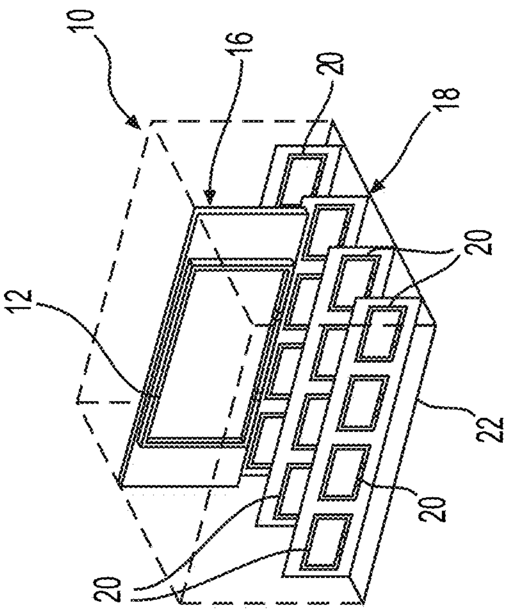
FIG. 3C is a perspective view of the full single cell of the DRRA.

Now referring to FIGS. 3A-3C, a single unit cell dipole-resonator resistive absorber (DRRA) 10 is shown. Although a polarization-independent DRRA 100 will be discussed below with reference to FIG. 4C, the single unit cell 10 of the DRRA is functional for only a single polarization of the incident wave. The DRRA 10 includes only a single first rectangular conductive ring 12. For purposes of simplification, FIG. 3A illustrates only a portion of the DRRA 10, which is fully shown in FIG. 3C. FIG. 3A shows the upper layer 16 of the DRRA 10, which is made of a single resistive ring 12 (shown as a rectangular metallic ring) with a pair of resistors 14 mounted thereon and in electrical communication therewith.

FIG. 3B shows only the lower layer 18 of the DRRA 10, which is made of a plurality of parallel linear arrays of second rectangular conductive rings 20. Each of the second rectangular conductive rings 20 has a pair of second resistors 28 mounted thereon and in electrical communication therewith. In the non-limiting example of FIG. 3B, sixteen such resistive rings 20 are shown, arrayed in four rows of four, although it should be understood that this number and arrangement may be varied. A perfect electric conductor (PEC) backing 22 is formed beneath the lower layer 18.

FIG. 3C shows the full DRRA 10, including both the upper layer 16 and the lower layer 18, where the first rectangular conductive ring 12 is mounted above the plurality of parallel linear arrays of the second rectangular conductive rings 20. The plurality of parallel linear arrays of the second rectangular conductive rings 20 is sandwiched between the first rectangular conductive ring 12 and the PEC layer 18. As in the previous embodiment, the dimensions of the first rectangular conductive ring 12 are larger than dimensions of each of the second rectangular conductive rings 20. Additionally, a first plane defined by the first rectangular conductive ring 12 may be parallel to planes defined by the plurality of parallel linear arrays of the second rectangular conductive rings 20, as shown.

The subwavelength DRRA 10 includes the rectangular ring 12 soldered with two identical lumped resistors 14 at symmetrical locations. As a non-limiting example, the rectangular ring 12 may be printed on a 0.77 mm thick FR4 epoxy glass substrate with a dielectric constant of 4.3 and a loss tangent of 0.025 (i.e., as a printed circuit board, with the FR4 substrate serving as the board). As a non-limiting example, in FIG. 3A, longitudinal width $\alpha_1$ is 24.00 mm, height $d_1$ is 14.20 mm, the longitudinal width of the ring 12, $l_1$, is 16.00 mm, and the height of the ring 12, $h_1$, is 8.30 mm. Corresponding to this non-limiting example, in FIG. 3B, each of the smaller rings 20 may have a longitudinal width $l_2$ of 4.70 mm, a longitudinal width of the backing $$a_2 = \frac{a_1}{4},$$

a height of the backing $d_2$ of 3.84 mm, and height of the ring 20, $h_2$, of 2.70 mm. The rectangular rings 20 in the lower layer 18 may also be printed on a substrate (i.e., formed as a printed circuit board), but on a thinner substrate than those of the larger rings 12. As a non-limiting example, RT/Duroid® 5880 laminate, manufactured by the Rogers Corporation, may be used, with a thickness of 0.127 mm, a dielectric constant of 2.2 and a loss tangent of 0.0009. The extreme low loss of such a substrate can minimize the interference effects at high frequencies. The central distance between the two resistors 14 is 6.00 mm, in this non-limiting example, and the central distance between resistors 28 is 1.12 mm. The pair of resistors (rather than a single long resistor) is used to avoid parasitic effects at higher frequencies; i.e., the geometric dimensions of the resistors should be in the deep subwavelength regime.

Both rings 12 and rings 20 may be printed on their respective substrates with electro-deposited copper, which is available for high etching accuracy and great circuit density. Using surface mounted technology (SMT), the lumped chip resistors (which may be R0201 and R01005 resistors, respectively) may be soldered on their respective substrates, connecting both sides of the metallic ring gap into a closed circuit.

As discussed above, the single cell DRRA 10 can be expanded into a polarization-independent DRRA by creating a two-dimensional array of multiple ones of DRRA 10. In order to understand the basic modes of such metallic rectangular rings arranged in a periodic array, as in FIGS.

4A-4C, the lateral modes are first extracted and analyzed, which can be coupled to longitudinal incident waves. The lateral geometry of the array is in the crossed "checkerboard" shape shown in FIGS. 4A-4C, thus enabling polarization-insensitive absorption performance, as well as to facilitate sample assembly. By placing the PEC backing 130 behind the DRRA structure, multiple electric and magnetic standing-wave resonances are generated along the normal direction to the two-dimensional (2D) checkerboard array, which are based on the strong couplings between the lateral modes on the periodic ring structure and longitudinal Fabry-Perot modes (via standing waves). The metallic rectangular ring is loaded with resistors, and the resistance is tuned to an optimal value. In order to extend the absorption spectrum to cover the whole 5G band, two layers of the DRRAs with different sizes are combined, and the interstitial spaces of the larger DRRA array are filled with microwave absorbing foam.

Figure 4A:
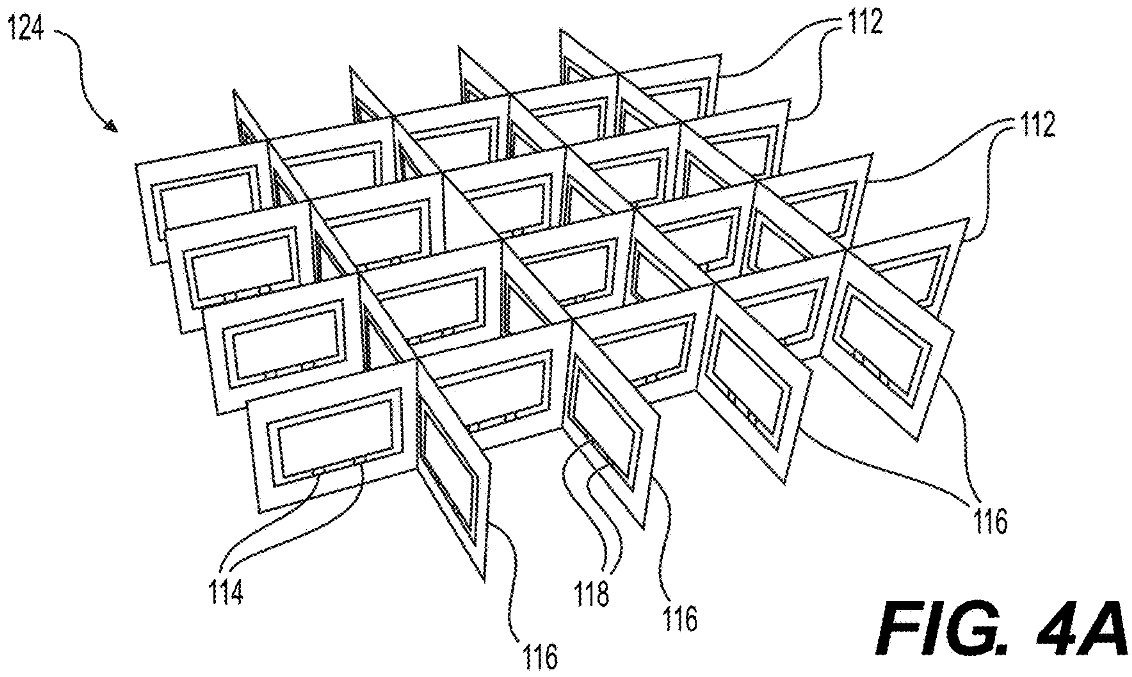
FIG. 4A is a perspective view of an upper layer of a polarization-independent dipole-resonator resistive absorber (DRRA).
Figure 4B:
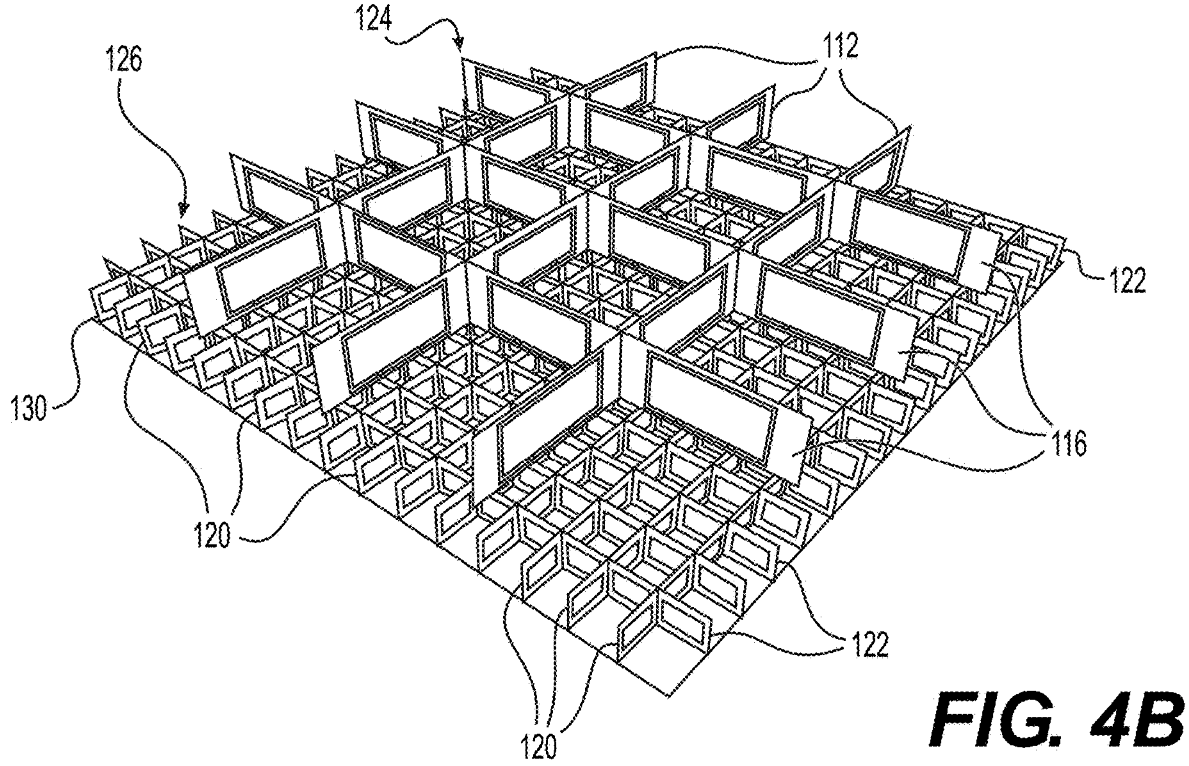
FIG. 4B is a perspective view of the upper layer of FIG. 4A mounted on a lower layer of the polarization-independent DRRA.
Figure 4C:
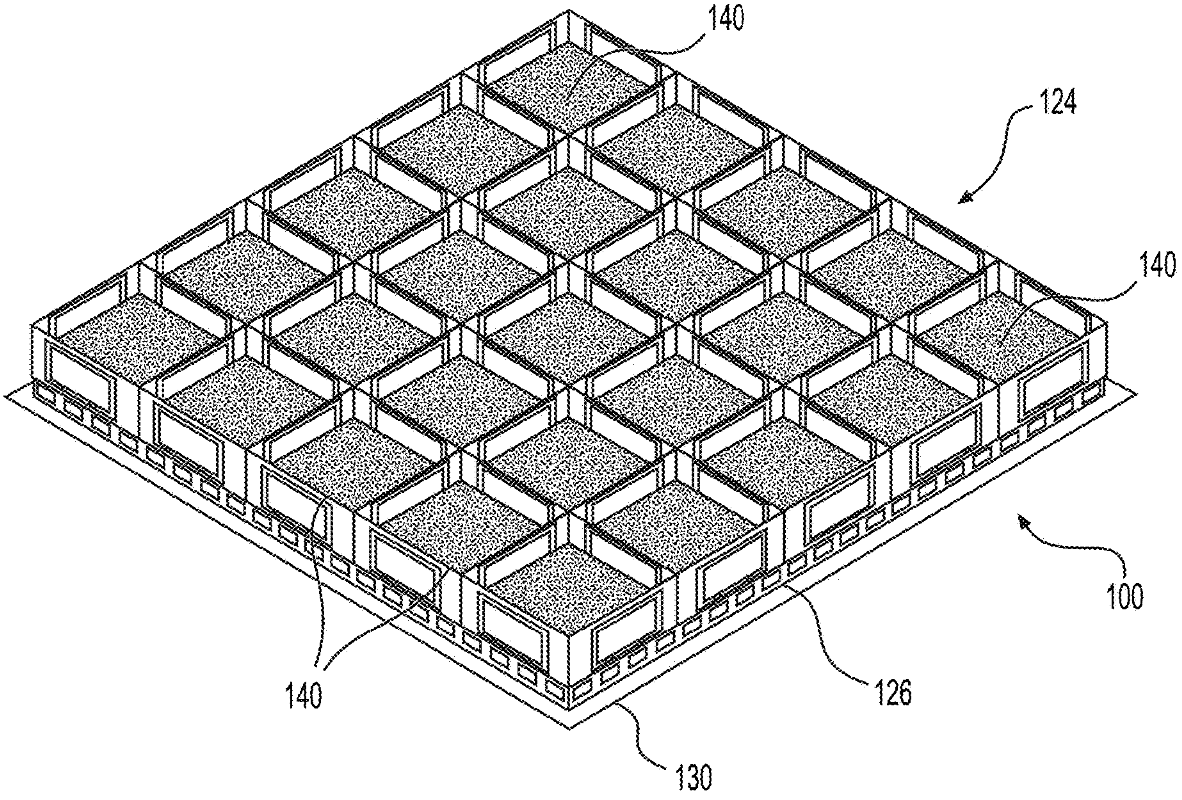
FIG. 4C is a perspective view of the full polarization-independent DRRA.

The dipole-resonator resistive absorber (DRRA) 100 of FIG. 4C is a broadband microwave absorber which exhibits near-perfect (i.e., 20 dB on average) absorption from 3 GHz to 40 GHz, with almost no measured incident angle dependence up to 45°. As shown in FIG. 4A, the dipole-resonator resistive absorber 100 is formed from a plurality of parallel, longitudinally-extending, linear arrays of first rectangular conductive rings 112 and a plurality of parallel, laterally-extending, linear arrays of second rectangular conductive rings 116, where the longitudinal and lateral directions are orthogonal to one another. Each of the first rectangular conductive rings 112 has a pair of first resistors 114 mounted thereon and in electrical communication therewith and, similarly, each of the second rectangular conductive rings 116 has a pair of second resistors 118 mounted thereon and in electrical communication therewith.

The plurality of parallel, longitudinally-extending, linear arrays of the first rectangular conductive rings 112 intersect the plurality of parallel, longitudinally-extending, linear arrays of the second rectangular conductive rings 116 to form an upper rectangular grid layer 124. As shown, adjacent ones of the first rectangular conductive rings 112 are separated by corresponding ones of the laterally-extending, linear arrays of the second rectangular conductive rings 116, and adjacent ones of the second rectangular conductive rings 116 are separated by corresponding ones of the longitudinally-extending, linear arrays of the first rectangular conductive rings 112, such that the plurality of parallel, longitudinally-extending, linear arrays of the first rectangular conductive rings 112 and the plurality of parallel, laterally-extending, linear arrays of the second rectangular conductive rings 116 define a rectangular array of interstitial chambers which, as shown in FIG. 4C, are filled with microwave-absorbing foam 140.

The dimensions of each of the first rectangular conductive rings 112 may be equal to the dimensions of each of the second rectangular conductive rings 116, and the resistances of each of the pairs of first resistors 114 may be equal to resistances of each of the pairs of second resistors 118, thus making the first and second rectangular conductive rings 112, 116 substantially identical in construction.

Additionally, as shown in FIG. 4B, a plurality of parallel, longitudinally-extending, linear arrays of third rectangular conductive rings 120 and a plurality of parallel, laterally-extending, linear arrays of fourth rectangular conductive rings 122 are provided. The plurality of parallel, longitudinally-extending, linear arrays of the third rectangular conductive rings 120 intersect the plurality of parallel, longitudinally-extending, linear arrays of the fourth rectangular conductive rings 122 to form a lower rectangular grid layer 126. Adjacent ones of the third rectangular conductive rings 120 are separated by corresponding ones of the laterally-extending, linear arrays of the fourth rectangular conductive rings 122, and adjacent ones of the fourth rectangular conductive rings 122 are separated by corresponding ones of the longitudinally-extending, linear arrays of the third rectangular conductive rings 120.

The third rectangular conductive rings 120 and the fourth rectangular conductive rings 122 are similar in construction to the first and second rectangular conductive rings 112, 116, including having third and fourth pairs of resistors respectively mounted thereon and in electrical communication therewith (not shown for purposes of simplification), but the third and fourth rectangular conductive rings 120, 122 have smaller dimensions compared to the first and second rectangular conductive rings 112, 116. The dimensions of each of the third rectangular conductive rings 120 may be equal to the dimensions of each of the fourth rectangular conductive rings 122, and the resistances of each of the pairs of third resistors may be equal to resistances of each of the pairs of fourth resistors, thus making the third and fourth rectangular conductive rings 120, 122 substantially identical in construction.

As shown in FIG. 4C, the upper rectangular grid layer 124 is mounted on the lower rectangular grid layer 126. An electrically conductive layer 130, referred to as a "perfect electrical conductor" (PEC) layer, is further provided. The lower rectangular grid layer 126 is sandwiched between the upper rectangular grid layer 124 and the PEC layer 130. The PEC layer 130 may be, as a non-limiting example, a thin metal plate. The basic unit of the DRRA 100 is the rectangular metallic ring (i.e., rings 112, 116, 120, 122), which is embedded in the printed circuit board (PCB) stripe, facilitating resonance excitation by an oscillating magnetic flux. Each ring 112, 116, 120, 122 is separated from its two nearest neighbors with a fixed separation that serves as a capacitor.

Figure 5C:
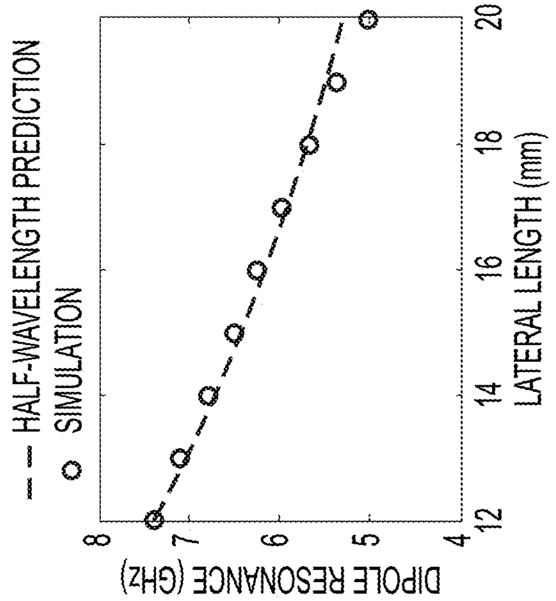
FIG. 5C is a plot showing a relationship between the first resonant frequency of the single rectangular conductive ring of FIG. 5A and its lateral length, comparing half-wavelength prediction with simulation.
Figure 5B:
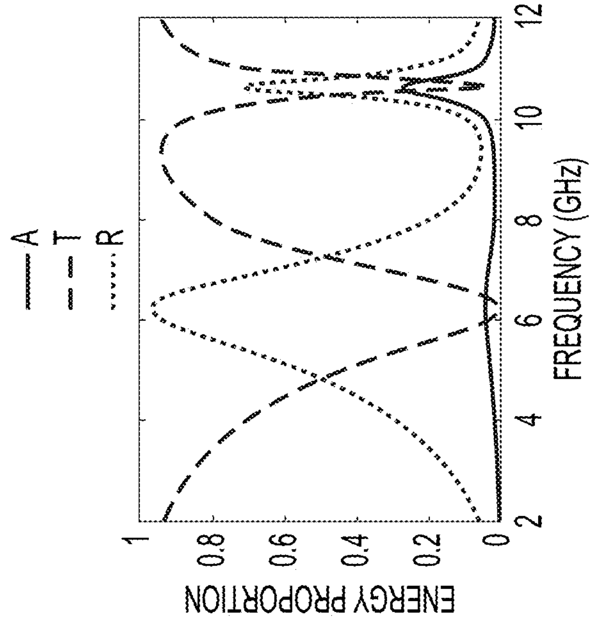
FIG. 5B is a graph showing extracted absorption (A), transmission (T) and reflection (R) for the testing of FIG. 5A.
Figure 5D:
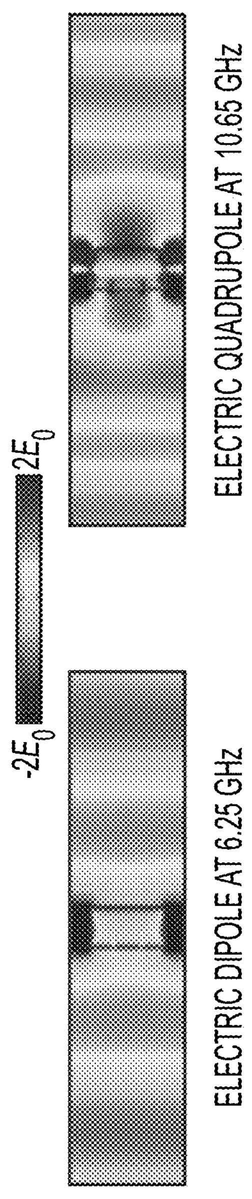
FIG. 5D illustrates the scattering electric fields at the two resonant frequencies of the single rectangular conductive ring of FIG. 5A.
Figure 5A:
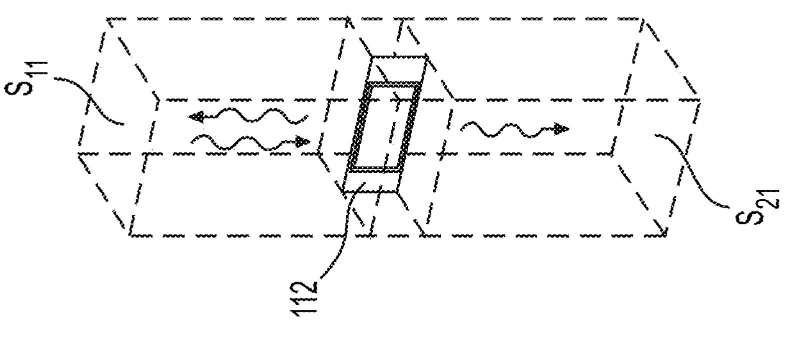
FIG. 5A diagrammatically illustrates a simulated testing setup for a single rectangular conductive ring of the DRRA.

In order to examine the underlying mechanism of DRRA 100, the basic lateral modes of a single metallic rectangular ring without PEC backing and soldered resistors is first examined, where the single metallic rectangular ring 112 is arranged in a periodic array, as illustrated in FIG. 5A. In this simulation, an incident wave with its electric component parallel to the ring plane is applied. Then the transmission, $T=|S_{21}|^2$, reflection, $R=|S_{11}|^2$, and absorption coefficient, $A=1-R-T$, can be calculated from S-parameters, as illustrated in FIG. 5B. The two dips in FIG. 5B (at 6.25 GHz and 10.65 GHz) correspond to the dipole and quadrupole modes, respectively, with symmetrical and anti-symmetrical electric field radiation patterns (see FIG. 5D). The scattering fields are obtained by subtracting total field by the incident field. The first electric dipole resonance is supported by the couplings between the nearby ring with the opposite charges accumulated on the opposite sides of the ring, and oscillating between the two sides, similar to a capacitor under AC excitation.

From the exemplary lateral length $l_1$ of 16 mm, this resonant frequency can be estimated by the half-wavelength resonance of a dipole antenna; i.e., the dipole resonant frequency is given by $$f_0(l_1) = \frac{c}{2(l_1 + h_1)}. \qquad (11)$$

The resonant frequencies from the simulation are in excellent agreement with the theoretical prediction, as shown in FIG. 5C. The second quadrupole resonance is a higher-order effect, and the two sides of the ring are with opposite phase, as shown in FIG. 5D. It should be noted that the dipole resonance peak is fairly broad, which indicates its potential for wideband coupling to the incident waves (forming a theoretical basis for this design serving as a good absorber). The asymmetrical line shape originates from the interference of the dipole mode and the higher-order quadrupole mode, which is known as "Fano resonance".

Building on the above, the situation where a PEC backing 130 is placed behind the rectangular ring, and two tunable resistors are loaded on it, can now be examined. In simulation, four small holes 150 are also opened to allow a small transmission base, as shown in FIG. 6A. Two identical resistors are used, with a total resistance value, R, of 44Ω, which is small and equivalent to a short-cut circuit. With the setup shown in FIG. 6A, the dispersive effective permittivity and permeability (of the first layer unit) are extracted from the S-parameters, as discussed above, thus obtaining the Lorentzian forms of the effective permittivity and permeability, which represent the electric resonance at 5.32 GHz and magnetic resonances at 3.38 GHz and 8.02 GHz, respectively (see FIG. 6B).

It is important to have considerable magnetic and electric responses simultaneously, in order for the impedance-matching condition to be satisfied over a broad frequency range, which requires electrical permittivity to be equal to the magnetic permeability. It is seen that with a small resistance, the resonances can be clearly delineated, whereas with the optimized resistance of 440Ω, a broadband impedance-matching becomes possible. It can be seen in FIG. 6C that over the wide frequency range from 4 GHz to 8 GHz, the real parts of $\varepsilon_r$ and $\mu_r$ are close to zero, while the imaginary parts are almost the same, which are exactly the desired properties for a perfect microwave absorber, as discussed above.

Figure 6B:
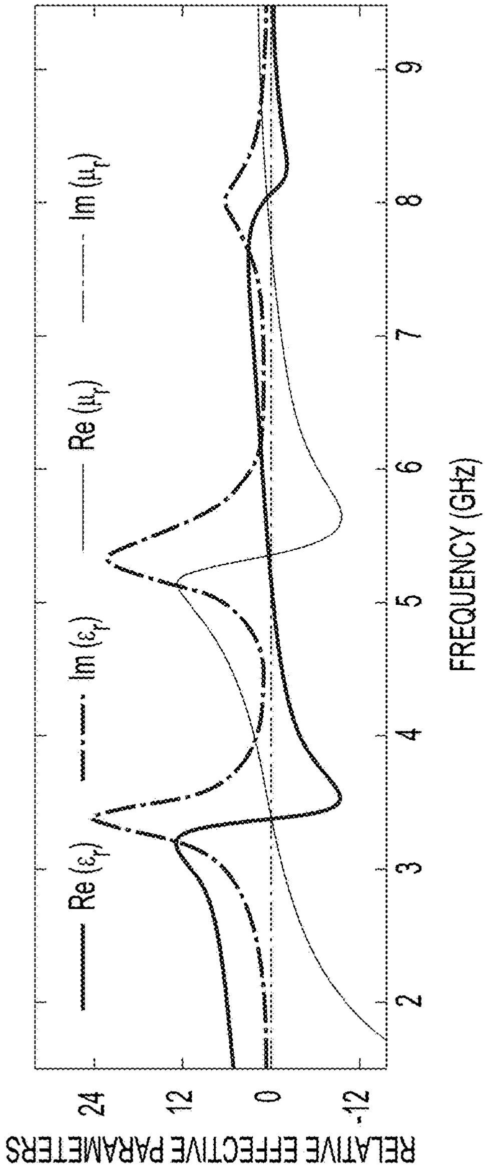
FIG. 6B shows a graph comparing the relative permittivity and permeability associated with the DRRA, plotted as a function of frequency, for a loaded resistance of 44Ω.

In FIG. 6B, it should be noted that the anti-resonance of $\mu_r$, is exactly the resonance of $\varepsilon_r$ and vice versa, which can be interpreted from the inherent duality of magnetic and electric fields in Maxwell's equations, leading to the two distinct current modes (i.e. magnetic and electric dipoles). Further, it is very important to have considerable magnetic and electric responses simultaneously in order for the impedance-matching condition to be satisfied over a broad frequency range, which requires permittivity to be equal to permeability. Thus, setting the resistors to have a small value enables the excitation patterns of the DRRA 10 to be seen at different frequencies, whereas setting the resistors to have the optimized value of 220Ω each leads to a broadening of the resonance peaks, resulting in a broadband, smooth absorption spectrum.

Figure 6C:
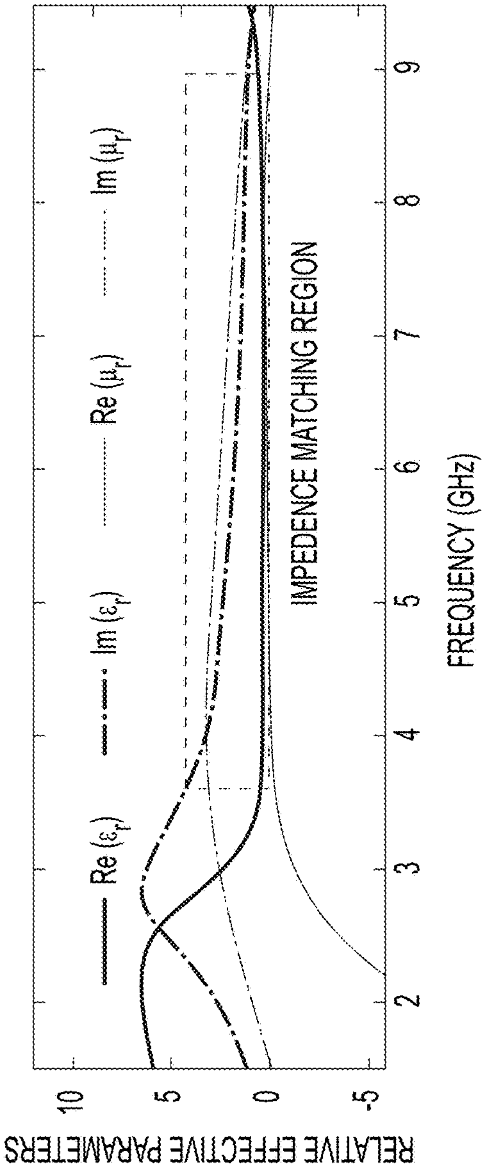
FIG. 6C shows a graph comparing the relative permittivity and permeability associated with the DRRA, plotted as a function of frequency, for a loaded resistance of 440Ω.
Figure 6A:
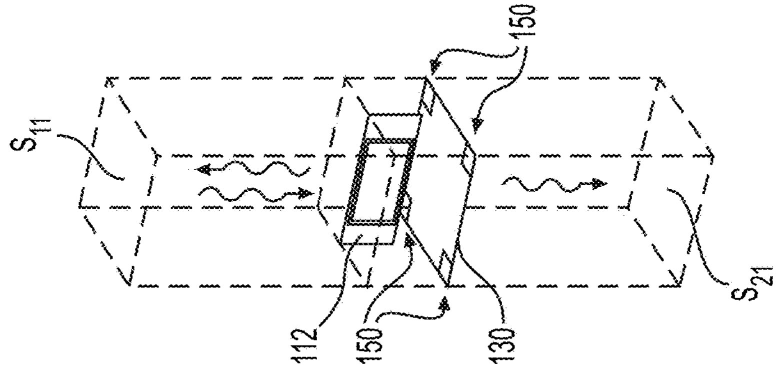
FIG. 6A diagrammatically illustrates a simulated testing setup for a single rectangular conductive ring of the DRRA with a PEC backing layer.

Since the dissipation of the incident wave is a necessary condition for an absorber, the value of each resistor may be adjusted to an optimal value of R=220Ω, as shown in FIG. 6C. It is seen in FIG. 6C that over the wide frequency range of 4 GHz to 8 GHz, the real parts of $\varepsilon_r$ and $\mu_r$ are close to zero, while the imaginary parts are almost the same, which are exactly the desired properties for a perfect microwave absorber.

In order to achieve broadband impedance matching (and thus broadband absorption), two identical series-connected chip resistors are soldered on each rectangular ring, as discussed above, as an additional degree of freedom to tune the loss of the system. By adjusting the total resistance, $Z_l$, the dispersion of the complex effective permittivity and permeability can be deliberately tuned to realize the two prescribed conditions for impedance matching and near-total absorption: $\varepsilon_r=\mu_r$ and $\mathrm{Im}(\varepsilon_r)kd=\mathrm{Im}(\mu_r)kd=1$, where k is the wave vector $k=\omega/c$.

The simulation of FIG. 6B shows that if $Z_l$ is small with a resistance value of 44Ω, there will be two magnetic resonances and one electric resonance in between, all characterized by the Lorentzian forms:

$$\chi(\omega) = 1 + \sum_i \frac{\omega_{ip}^2}{\omega_i^2 - \omega^2 - i\omega\beta}, \tag{4}$$

where $\chi$ denotes either $\varepsilon_r$ or $\mu_r$, $\omega_i$ and $\omega_{ip}$ are the relevant resonant frequency and the plasma frequency, respectively, and $\beta$ is the damping coefficient. At the three resonance frequencies, the surface impedance of the DRRA 100 (at the top side of the ring) exhibits an artificial PEC or perfect magnetic conductor (PMC) effect. It should be noted that the electric resonance is actually the magnetic anti-resonance and vice versa, due to the distinct symmetries of the resonant modes. Similar correspondences have also been found in acoustic systems. By increasing the resistance to an optimal value of $Z_l$=440Ω (near the vacuum impedance), the dispersive resonances coalesce to a smooth curve. In particular, the imaginary parts of $\varepsilon_r$ and $\mu_r$ have almost the same value, while their real parts are close to zero (see FIG. 6C). This is exactly the theoretical conditions given above for near-perfect absorption.

Figure 6D:
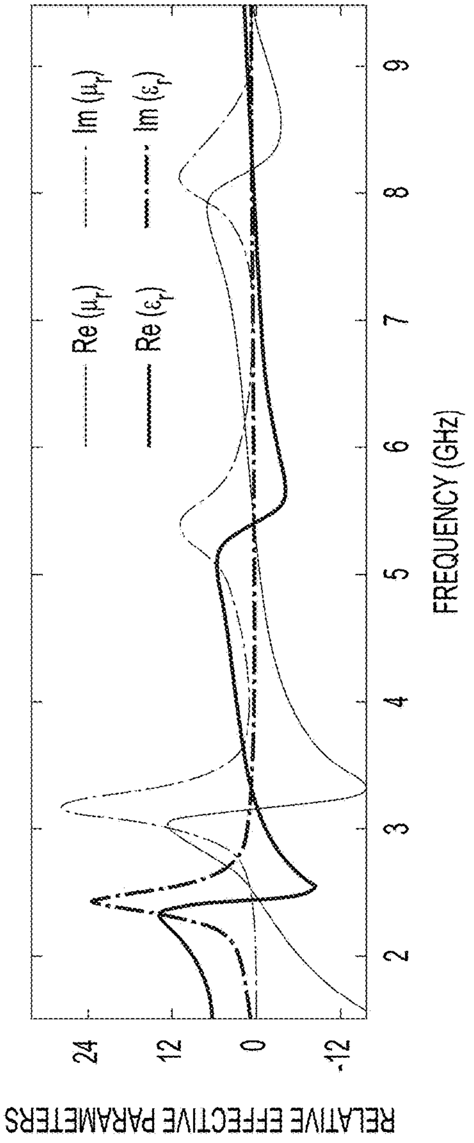
FIG. 6D shows a graph comparing the relative permittivity and permeability associated with the DRRA, plotted as a function of frequency, for a loaded resistance of 4400Ω.

Interestingly, if the resistance is set to be a much larger value of Z 1=4400 SI, magnetic resonances are converted to electric resonances and vice versa, together with the appearance of a new magnetic resonance at a low frequency (see FIG. 6D). The limit of the resistance value in the two opposite regimes can be understood from the perspective of short circuit and open circuit limits, both of which are almost lossless with negligible absorption. It should be noted that while the form of the effective parameters $\varepsilon_r$ and $\mu_r$ should be uniaxial tensors in the form of diag($\chi$, $\chi$, h), $\chi$≠h, owing to the asymmetrical structure of the DRRA in the longitudinal direction, but for normal and small angle incidence it makes no difference to the dispersion engineering if we treat the absorbing layer to be isotropic. In FIG. 6C, the boxed region shows the frequency range 3.6 GHz to 9 GHz, where the surface impedance of the metamaterial is well matched with the vacuum impedance. The transition from dispersive resonances to broadband impedance-matching condition can be clearly seen.

Figure 10A:
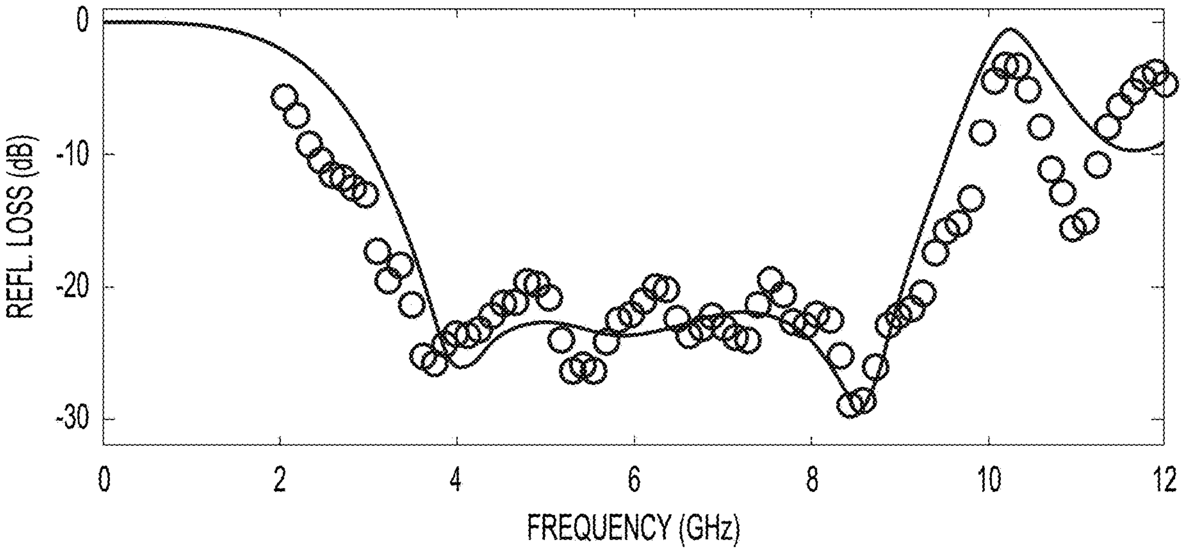
FIG. 10A shows the reflection loss spectra for an individual rectangular conductive ring of the upper layer of the DRRA.
Figure 10B:
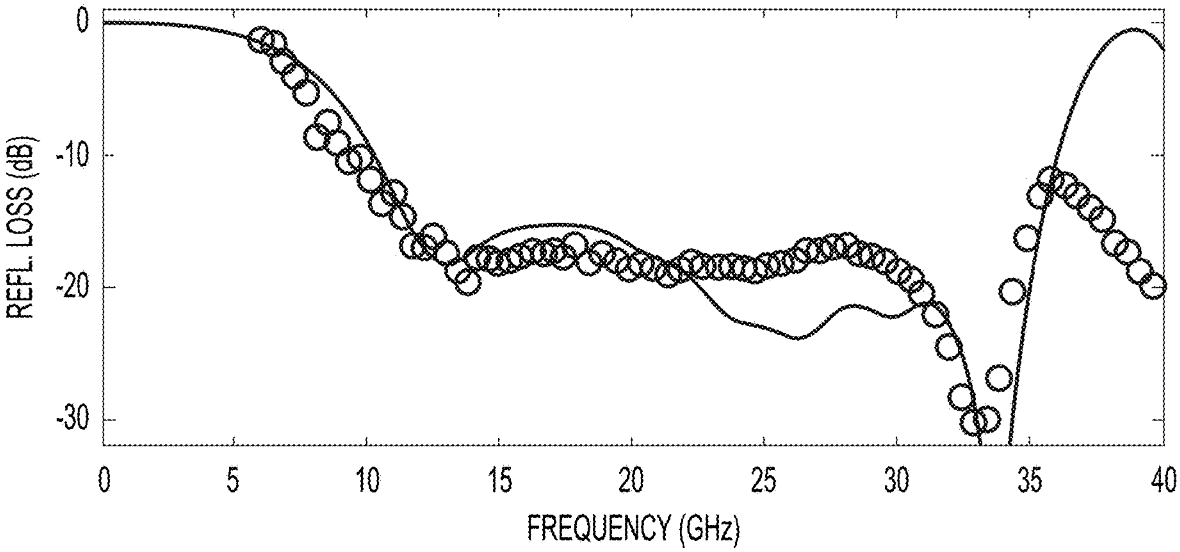
FIG. 10B shows the reflection loss spectra for an individual rectangular conductive ring of the lower layer of the DRRA.

In order to examine the effect of dispersion engineering, the optimal resistance is adopted throughout the simulations discussed below. As can be seen in FIG. 10A, the individual larger ring-structure (i.e., a single ring such as ring 112) exhibits an excellent absorption from 3.6-9 GHz with over −20 dB reflection loss, with good agreement between measurement and simulation. The physical phenomena of waves are closely linked to the ratio between the wavelength and the size of the structure, usually denoted by the scaling parameter. In the present case, if the dimensions of the larger ring structure are uniformly scaled by a factor of $\alpha$ ($\alpha$<1), while the material properties (e.g., the resistance, dielectric constant of the substrate) are kept unchanged, the operating band can be extended to a higher frequency range, i.e., from 3.6/$\alpha$−9/$\alpha$ GHz. In the present case, the optimal value of a is chosen to be ¼. For the ease of practical sample fabrication, not every material property can be kept the same under realistic considerations (e.g., the dielectric constant of the high-frequency PCB substrate is usually smaller in the industrial production). Therefore, the geometric parameters for the smaller ring have to be slightly adjusted to retain the scaling property of the operating frequency band, by a repeat application of dispersion engineering. However, the loaded resistance ($Z_l$=440Ω) remains unchanged and the lateral lattice constant is strictly scaled by the ¼ factor. As shown in FIG. 10B, the small ring structure also exhibits excellent broadband absorption performance, with close to −20 dB reflection loss, from 10-36 GHz. In FIGS. 10A and 10B, the solid line indicates the simulation results and the circles represent the experimental measurements.

Figure 11:
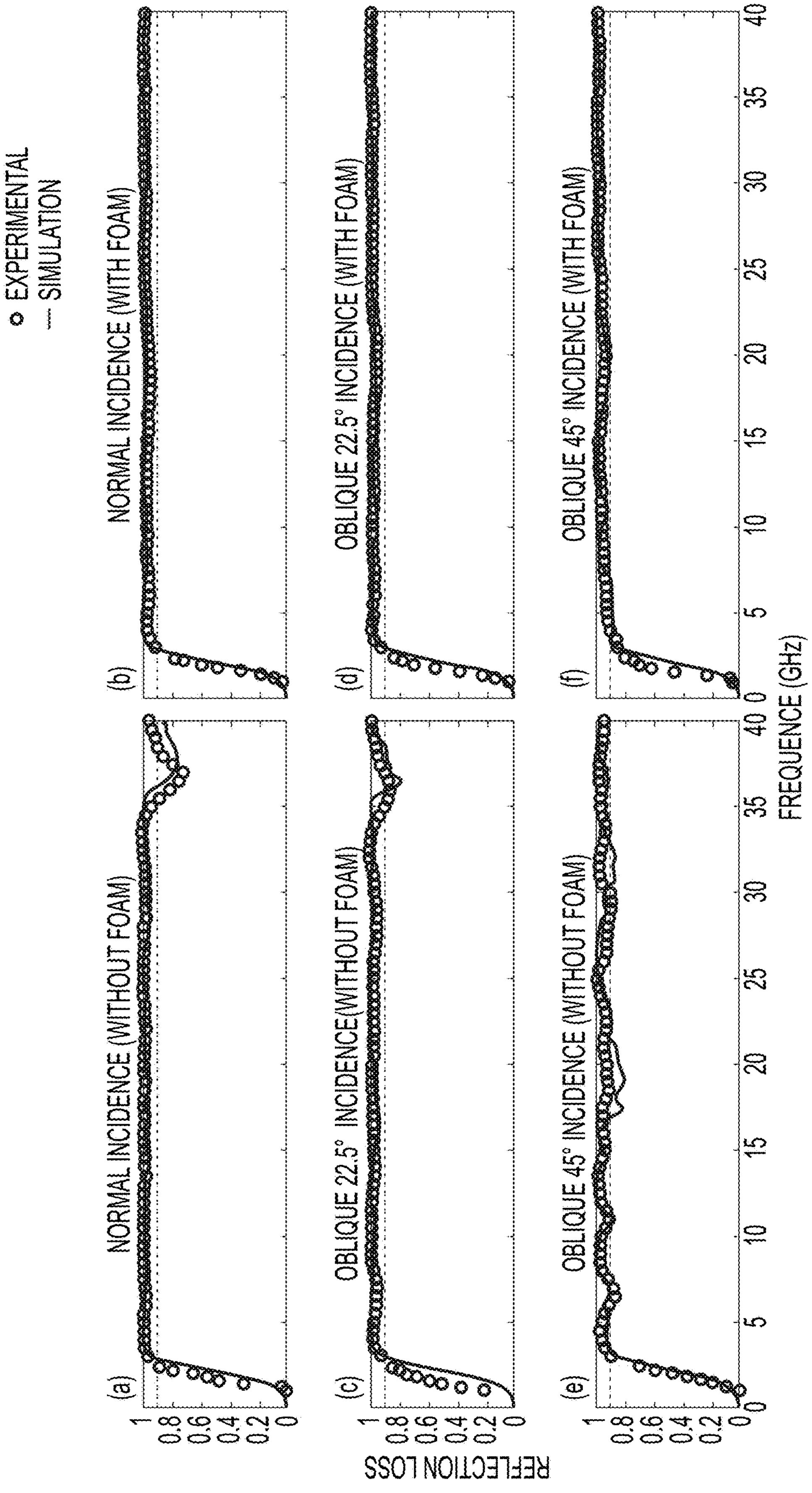
FIG. 11 shows a comparison of graphs showing the reflection loss performance with the normal and oblique incidence (averaged using the data of TE and TM polarizations) for the DRRA, where curves (a) and (b) show normal incidence, curves (c) and (d) show oblique incidence at 22.5°, and curves (e) and (f) show oblique incidence at 45°.

The purpose of designing two similar arrays with scaled spatial dimensions is to splice the absorption spectra so as to let each absorb in its own absorption band. The two-layer, integrated hierarchical structure of the DRRA 100 exhibits ultra-broadband reflection loss from 3-35 GHz, as shown in graph (a) of FIG. 11. However, diffraction invariably arises in the higher frequency range over such an ultra-broadband coverage. Absorption in the lower frequency range (by the upper layer) is minimally affected by the lower layer, owing to the smaller dimensions of the rings as compared to the relevant wavelength. In the higher frequency regime, however, the upper layer would diffract a part of the incident wave, while the lower layer would absorb the remaining part. In order to dissipate the diffracted components, the microwave-absorbing foam 140 is used to fill the upper layer interstitial spaces of the upper layer of DRRA 100. The foam 140 is porous and dissipative, with low mass density and small loss angle. In this manner, the diffracted energy can be effectively absorbed inside the DRRA 100. With the assistance of the foam, the DRRA 100 can also absorb the microwave radiation very well at frequencies higher than 40 GHz. In FIG. 11, the solid lines represent the simulation results of reflection loss, and the circles represent the experimental measurements. In FIG. 11, graphs (a), (c) and (e) show the results for the DRRA 100 without the additional microwave-absorbing foam 140, and graphs (b), (d) and (f) show the results for the DRRA 100 with microwave-absorbing foam 140.

The motivation for integrating two layers into DRRA 100 is to let the upper and lower layers 124, 126, respectively, absorb independently for their respective frequency bands. An important reason why the upper layer 1234 cannot have broadband absorption at higher frequencies is because above 12.5 GHz, the unit period $\alpha_1$ becomes larger than the relevant wavelength, which can lead to diffraction, and the previous impedance-matching mechanism achieved by dispersion engineering cannot work in this frequency regime. Thus, it is necessary to introduce another layer with smaller units with a similar geometric structure in order to absorb in the higher frequency range.

Figure 7:
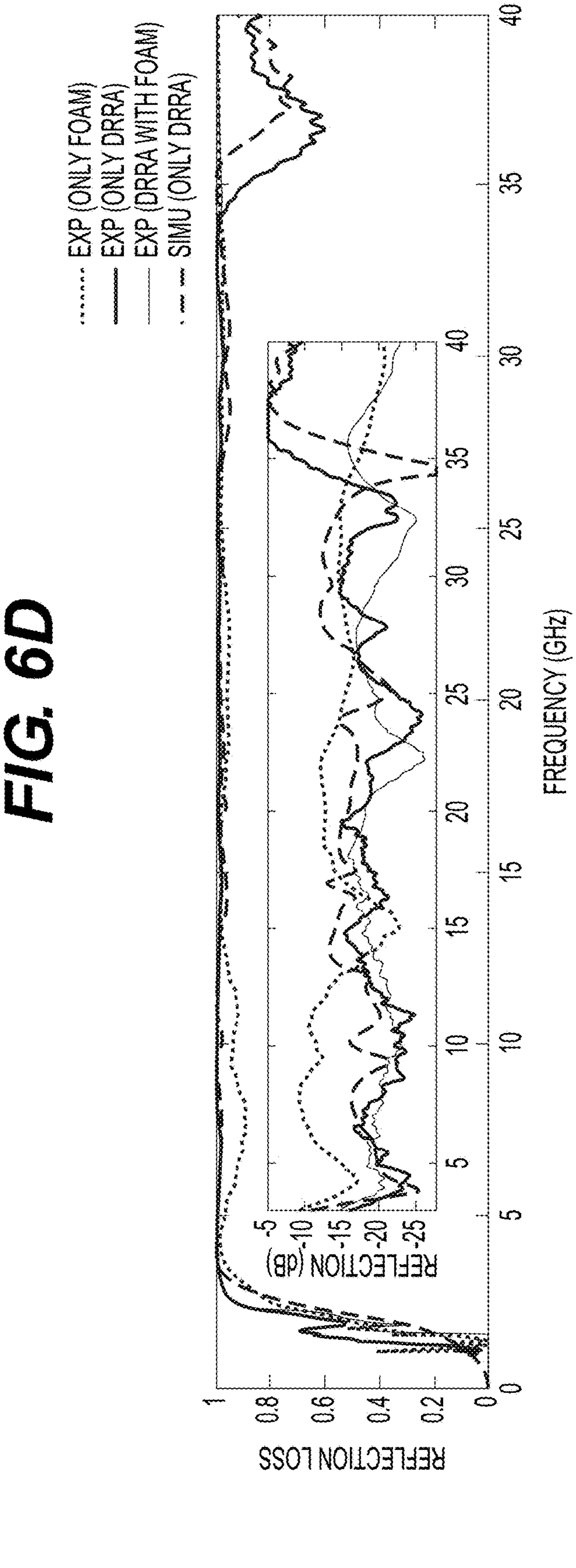
FIG. 7 is a graph comparing experimental and simulated results of reflection loss spectra of the DRRA, both with the addition of microwave-absorbing foam and without, and against the microwave-absorbing foam alone.

The performance of this structure is examined both numerically and experimentally to confirm the feasibility of splicing the two absorption spectra (see the "simulation" curve and the "experiment" curves in FIG. 7, which are identified in FIG. 7 as "SIMU" and "EXP", respectively). An averaged reflection loss of 19.50 dB from 3 GHz to 35 GHz can be achieved by using the hierarchical (stacked) structure of DRRA 100. Combining some conventional microwave-absorbing foam (with a thickness of 4.7 mm) is also examined to see if it can enhance the high frequency absorption and obtain a satisfying result in improving the performance in the 35-40 GHz range, which is also shown in FIG. 7. It should be noted that additional foam is added without increasing the total thickness (14.2 mm) because the absorbing foam patches are placed in the interstitial spaces of the upper layer 124 of DRRA 100, as shown in FIG. 4C. The absorbing performance of the foam with the same thickness of DRRA 100 was also measured. As expected, the foam has an excellent absorbing performance only at higher frequencies, but at lower frequencies (below 12.5 GHz), it is poor when compared to DRRA 100 (also shown in FIG. 7).

Figure 8:
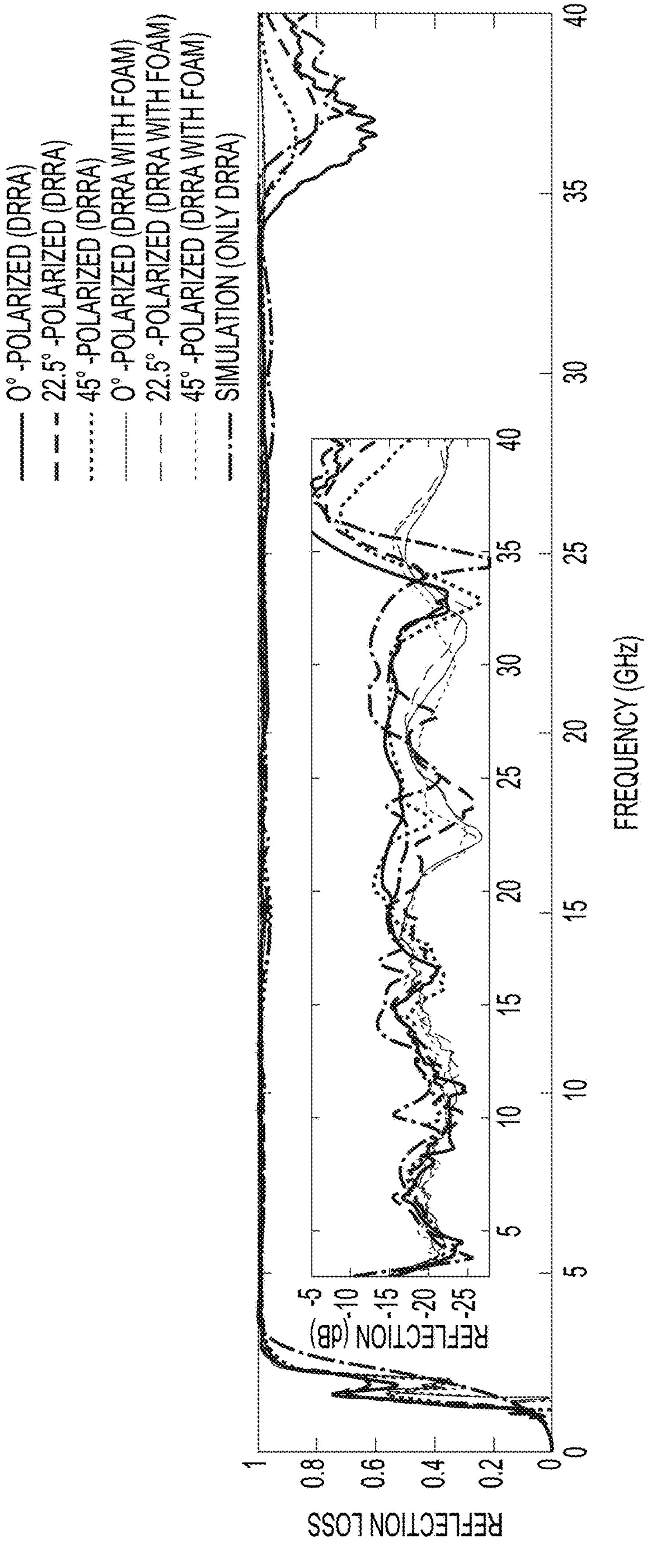
FIG. 8 is a graph comparing experimental and simulated results of performance at differing polarization angles under normal incidence for the DRRA, both with the addition of microwave-absorbing foam and without.

In FIG. 7, all results were obtained under the condition that the electric field was parallel to the ring plane (i.e., 0°-polarized). Because the crossed "checkerboard" structure has a 4-fold spatial symmetry, only the polarization from 0° to 45° needs to be examined. In simulation, all polarization incident excitations yielded the same results, as shown in FIG. 8. As expected, the experimental measurements also show similar effects (see FIG. 7), whether the DRRA 100 includes foam 140 or not. This is expected, since a normal incident wave with arbitrary polarization angles can always be linearly decomposed into TE and TM polarized waves.

Figure 9:
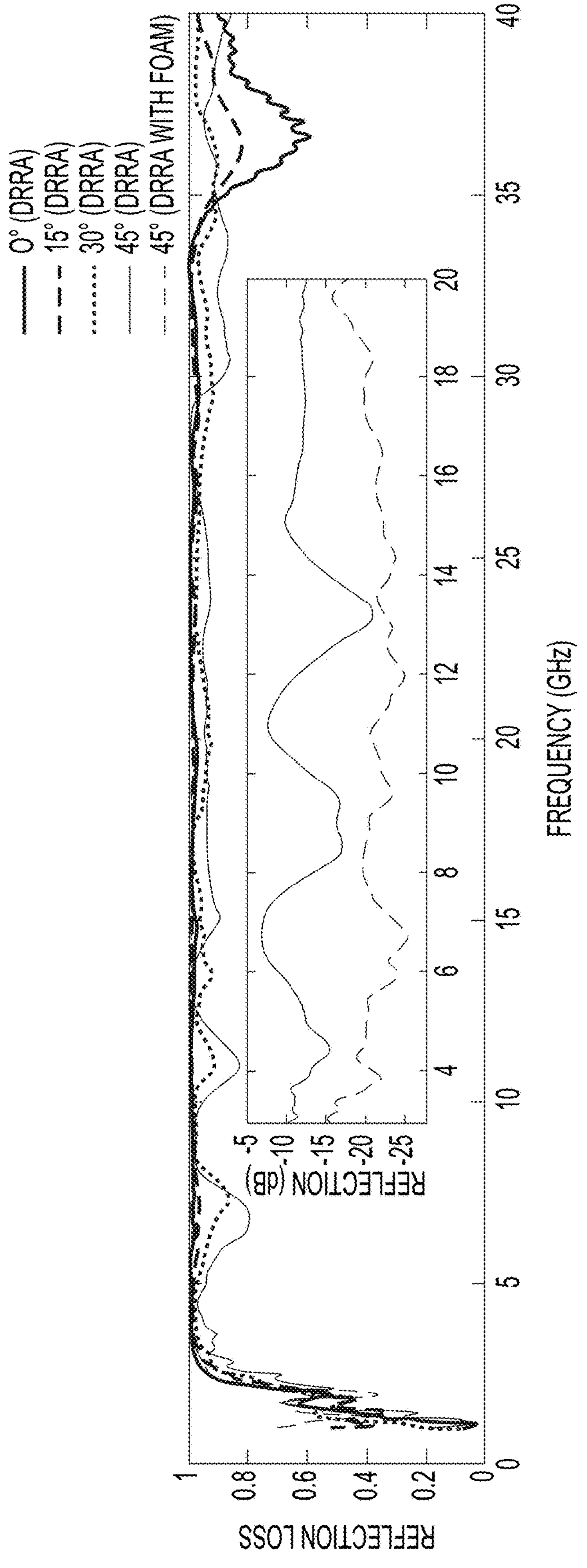
FIG. 9 is a graph comparing results of performance at differing oblique incident angles for the DRRA, both with the addition of microwave-absorbing foam and without.

For oblique incidence under 30°, the performance of the sample DRRA 100 without foam does not significantly degrade, as shown in FIG. 9. However, at 45° oblique incidence, the absorption at lower frequencies becomes worse due to the diffraction effect. However, this problem can be fixed by applying the foam 140. As a result of using the foam (shown in the inset of FIG. 9), the combined structure can improve the performance for all frequencies measured under 45° oblique incidence. It should be noted that the inserted microwave absorbing foam is also very helpful in absorbing the diffracted waves at oblique incidences, thus further enhancing the practical applications of DRRA 100. The final result can be seen in FIG. 9, where the curves both undulate around 20 dB reflection loss on average across the very broad frequency range of 3 GHz to 30 GHz.

At oblique incidence, the reflection coefficient can be different for the TE and TM polarizations. Curves (c)-(f) of FIG. 11 show the average of the reflection loss with TE and TM polarizations. Both the simulation and experimental results show that under 22.5° oblique incidence, the reflection loss performance is almost the same with that under normal incidence (see curves (c) and (d) of FIG. 11), which indicates excellent insensitivity to the incidence angle. For a larger incidence angle of 45°, the reflection loss spectra also display efficient performance with over 90% reflection loss, as shown in curves (c) and (d) of FIG. 11. It should be noted that the auxiliary foam 140 plays an important role in converting the diffracted energy at higher frequencies into absorption inside the DRRA 100 by increasing the attenuation length. This has considerable effect in smoothing the reflection loss spectra, as can be seen by comparing the curves (a), (c) and (e) against corresponding curves (b), (d) and (f) of FIG. 11.

As noted above, the upper layer 124 of DRRA 100 already exhibits broadband absorption on its own. Additionally, the couplings between the upper and lower layers 124, 126, respectively, are weak, thus allowing the two layers to absorb nearly independently. In the low frequency band, the wavelength is long, so the lower layer 126 can be penetrated by electromagnetic waves like in vacuum, thus having negligible effects on the low frequency absorption band of the upper layer 124. At the higher frequencies, while most of the energy is absorbed by the lower layer 126, a small part of the incident waves can be diffracted by the upper layer 124 and eventually be absorbed. Thus, this diffracted part cannot be detected in the specular reflection direction, and the foam 140 plays an important role in their absorption. Additionally, the overall thickness of the DRRA 100 (with foam 140) is 14.2 mm, which is only 1.2 mm over the minimum thickness dictated by the causality constraint. In comparing this to the microwave-absorbing foam with the same thickness, the foam exceeds the minimum thickness dictated by the causality constraint by 40.4%, as compared to 9.2% for DRRA 100.

A non-limiting example of microwave-absorbing foam which may be used is that manufactured by the Dalian Dongxin Microwave Absorbing Material Co. Ltd. of China. The foam may be cut to the same size as DRRA 100; i.e., corresponding to the exemplary dimensions given above, this would be 200 mm×220 mm×14.2 mm. Testing of 1-40 GHz absorption for the sample DRRA was performed using a far-field measurement system, using the free space method. Testing was performed in a darkroom with dimensions of 1.5 m×1.5 mλ2 m, and the testing equipment included a vector network analyzer (model N532B, manufactured by Keysight Technologies®), a pair of 40 GHz electronic cables (model UF40, manufactured by Lair Microwave), three pairs of double-ridge horn antennas, which were 1-20 GHz, 6-18 GHz, and 18-40 GHz, respectively. The darkroom was covered with 205 mm-height absorbing foam on the surrounding four surfaces, and also 295 mm-height absorbing foam on the front and back door. The vector network analyzer (VNA) was both a signal source and an analyzer, with a frequency band of 10 MHz-43.5 GHz. The cables transported the signal from the VNA to the horns. Each pair of horns had a relative angle of 5-10° between them and separately played the roles of radiating and receiving.

For purposes of analysis, if the diameter of the horn is $D_h$, and the wavelength of the incident wave is λ, then in order to reach the far-field radiation condition, the distance between horns, $L_{hs}$, for the sample should satisfy the relation $$L_{hs} > \frac{2D_h 2}{\lambda}.$$

To make the incident microwave fully interact with the sample, the side length of the sample was larger than five wavelengths. Because of the size limitation of the darkroom and the weakening of the low-frequency directivity of the horn, the absorption curve had a relatively large oscillation near the low frequency, $P_m$. If the reflection power of the sample is $P_s$, then the band of 1-3 GHz represents the universal difficulty of measurements at low frequencies. However, above 3 GHz, the experimental results were accurate and in excellent agreement with the simulations. In the measurement system, the sample and horns were put at the front and back sides of the darkroom. A flat 3.2 mm-thick metal plate with the same lateral dimensions as the DRRA sample was used to calibrate the background reflection coefficient of the sample, which was evaluated as $$\Gamma = \frac{P_s}{P_m}.$$

The absorption of the sample is given by $A=1-|\Gamma|^2$. For the polarization test geometry, the positions of the horns were kept unchanged, while the calibration metallic plane and the sample rotated.

It is to be understood that the dipole-resonator resistive absorber is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A dipole-resonator resistive absorber, comprising:

a first rectangular conductive ring having a pair of first resistors mounted thereon and in electrical communication therewith;

a plurality of parallel linear arrays of second rectangular conductive rings, wherein each of the second rectangular conductive rings has a pair of second resistors mounted thereon and in electrical communication therewith, wherein the first rectangular conductive ring is mounted above the plurality of parallel linear arrays of the second rectangular conductive rings; and an electrically conductive layer, wherein the plurality of parallel linear arrays of the second rectangular conductive rings is sandwiched between the first rectangular conductive ring and the electrically conductive layer.

2. The dipole-resonator resistive absorber as recited in claim 1, wherein dimensions of the first rectangular conductive ring are larger than dimensions of each of the second rectangular conductive rings.

3. The dipole-resonator resistive absorber as recited in claim 1, wherein a first plane defined by the first rectangular conductive ring is parallel to planes defined by the plurality of parallel linear arrays of the second rectangular conductive rings.

4. A polarization-independent dipole-resonator resistive absorber comprising a two-dimensional array of multiple ones of the dipole-resonator resistive absorber recited in claim 1.

5. A dipole-resonator resistive absorber, comprising:

a plurality of parallel, longitudinally-extending, linear arrays of first rectangular conductive rings, wherein each of the first rectangular conductive rings has a pair of first resistors mounted thereon and in electrical communication therewith;

a plurality of parallel, laterally-extending, linear arrays of second rectangular conductive rings, wherein each of the second rectangular conductive rings has a pair of second resistors mounted thereon and in electrical communication therewith, wherein the plurality of parallel, longitudinally-extending, linear arrays of the first rectangular conductive rings intersect the plurality of parallel, longitudinally-extending, linear arrays of the second rectangular conductive rings to form an upper rectangular grid layer, wherein adjacent ones of the first rectangular conductive rings are separated by corresponding ones of the laterally-extending, linear arrays of the second rectangular conductive rings, and adjacent ones of the second rectangular conductive rings are separated by corresponding ones of the longitudinally-extending, linear arrays of the first rectangular conductive rings, such that the plurality of parallel, longitudinally-extending, linear arrays of the first rectangular conductive rings and the plurality of parallel, laterally-extending, linear arrays of the second rectangular conductive rings define a rectangular array of interstitial chambers;

a plurality of parallel, longitudinally-extending, linear arrays of third rectangular conductive rings, wherein each of the first rectangular conductive rings has a pair of third resistors mounted thereon and in electrical communication therewith;

a plurality of parallel, laterally-extending, linear arrays of fourth rectangular conductive rings, wherein each of the fourth rectangular conductive rings has a pair of fourth resistors mounted thereon and in electrical communication therewith, wherein the plurality of parallel, longitudinally-extending, linear arrays of the third rectangular conductive rings intersect the plurality of parallel, longitudinally-extending, linear arrays of the fourth rectangular conductive rings to form a lower rectangular grid layer, wherein adjacent ones of the third rectangular conductive rings are separated by corresponding ones of the laterally-extending, linear arrays of the fourth rectangular conductive rings, and adjacent ones of the fourth rectangular conductive rings are separated by corresponding ones of the longitudinally-extending, linear arrays of the third rectangular conductive rings, wherein the upper rectangular grid layer is mounted on the lower rectangular grid layer; and an electrically conductive layer, wherein the lower rectangular grid layer is sandwiched between the upper rectangular grid layer and the electrically conductive layer.

6. The dipole-resonator resistive absorber as recited in claim 5, wherein dimensions of each of the first rectangular conductive rings are equal to dimensions of each of the second rectangular conductive rings.

7. The dipole-resonator resistive absorber as recited in claim 6, wherein resistances of each of the pairs of first resistors are equal to resistances of each of the pairs of second resistors.

8. The dipole-resonator resistive absorber as recited in claim 7, wherein dimensions of each of the third rectangular conductive rings are equal to dimensions of each of the fourth rectangular conductive rings.

9. The dipole-resonator resistive absorber as recited in claim 8, wherein resistances of each of the pairs of third resistors are equal to resistances of each of the pairs of fourth resistors.

10. The dipole-resonator resistive absorber as recited in claim 9, wherein the dimensions of each of the first and second rectangular conductive rings are larger than the dimensions of each of the third and fourth rectangular conductive rings.

11. The dipole-resonator resistive absorber as recited in claim 5, wherein each of the interstitial chambers is filled with microwave-absorbing foam.

* * * * *